US008813440B2

(12) United States Patent  
Potter et al.

(10) Patent No.: US 8,813,440 B2
(45) Date of Patent: Aug. 26, 2014

(54) SOLAR CANOPY CONNECTOR SYSTEM (75) Inventors: David S. Potter, Danville, CA (US); Jeff P. Munoz, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 1264 days.

(21) Appl. No.: 12/604,973

(22) Filed: Oct. 23, 2009

(65) Prior Publication Data

US 2010/0163015 A1 Jul. 1, 2010

(51) Int. Cl.
- *E04D 13/18* (2014.01)
- *F24J 2/52* (2006.01)
- *F24J 2/04* (2006.01)
- *H01L 31/042* (2014.01)
- *F24J 2/46* (2006.01)

(52) U.S. Cl.
CPC .............. *F24J 2/5258* (2013.01); *F24J 2/5205* (2013.01); *Y02E 10/44* (2013.01); *F24J 2/045* (2013.01); *F24J 2/5232* (2013.01); *F24J 2/5245* (2013.01); *Y02E 10/50* (2013.01); *Y02B 10/20* (2013.01); *H01L 31/0422* (2013.01); *F24J 2002/4661* (2013.01); *Y02E 10/47* (2013.01)
USPC .............. 52/173.3; 52/489.1; 52/772; 52/468

(58) Field of Classification Search
USPC ................... 52/468, 489.1, 772, 774, 506.05; 250/363.05, 363.08; 126/696, 700, 126/704, 569; 211/41.1, 1.51; 248/500, 214
See application file for complete search history.

(56) References Cited

U.S. PATENT DOCUMENTS

| 3,509,674 | A | * | 5/1970 | Birum, Jr. ............... 52/302.1 |
| 4,481,774 | A | | 11/1984 | Snook |
| 6,155,017 | A | | 12/2000 | Turner |
| 6,470,632 | B1 | | 10/2002 | Smith |

(Continued)

OTHER PUBLICATIONS

New Mexico State University, Eye On Research; Sun-News; NMSU to get solar-powered parking structure, Dec. 11, 2006, p. 6A, also found at: http://www.werc.net/News/Press%20Releases/IEE20StructureStory.pdf.

(Continued)

*Primary Examiner* — Brian Glessner
*Assistant Examiner* — Adam Barlow
(74) *Attorney, Agent, or Firm* — Carlos L. Hanze (57) ABSTRACT

A solar canopy connector system for attaching a solar power array to a Zee channel, including: an anchor member for affixing to a top portion of a Zee channel and for resting against the bottom portion of two solar power arrays; a planar step section; a riser section; and an angled kick section for hooking an edge portion of a Zee channel. Also included is a head member for attaching to the anchor member for clamping the two solar power arrays between a bottom portion of the head member and a top portion of the anchor member, including an elongated form including multiple sections, the sections including: two vertical planar riser sections; a horizontal joiner section; two horizontal planar clamping sections, for clamping solar power arrays, thus forming a U-like assembly with flanges extending from the two top portions of the U-like assembly; where the head member can be affixed to the anchor member, where a bottom portion of the solar power arrays rests on a top portion of the planar step section of the anchor member, and a bottom portion of the planar clamping sections of the head member rests on a top portion of the solar power arrays, thereby clamping the two solar power arrays to the Zee channel.

12 Claims, 5 Drawing Sheets

(56) References Cited

U.S. PATENT DOCUMENTS

| | | | |
|---|---|---|---|
| 6,685,390 B1 | 2/2004 | Eitzen | |
| 7,237,360 B2 | 7/2007 | Moncho et al. | |
| 7,260,918 B2 * | 8/2007 | Liebendorfer | 52/173.3 |
| 7,531,741 B1 | 5/2009 | Melton et al. | |
| 7,743,575 B2 * | 6/2010 | Ito | 52/582.1 |
| 7,810,489 B2 * | 10/2010 | Liu et al. | 126/569 |
| 8,430,372 B2 * | 4/2013 | Haddock | 248/500 |
| 8,453,986 B2 * | 6/2013 | Schnitzer | 248/237 |
| 2007/0246039 A1 | 10/2007 | Brazier et al. | |
| 2009/0050194 A1 | 2/2009 | Noble et al. | |
| 2009/0223142 A1 | 9/2009 | Shingelton et al. | |
| 2010/0073220 A1 * | 3/2010 | Olesen et al. | 342/174 |
| 2010/0083954 A1 * | 4/2010 | Bartelt-Muszynski | 126/704 |

OTHER PUBLICATIONS

Sundial Energy, Inc., SmartShade Solar Parking Structures, printed Jan. 21, 2010, pp. 1-3, also found at: http://www.sundialenergy.com/se_css_pages/product_shade.htm.

David Nagel, Campus Technology, UCSD Plants Solar Trees on Parking Structures, Sep. 8, 2008, pp. 1-3, also found at: http://www.campustechnology.com/Articles/2008/09/UCSD-Plants-Solar-Trees-on-Parking-Structures.aspx.

Justin, for Metaeficient.com, Solar Canopies For Parking Lots, printed Jan. 21, 2010, pp. 1-9, also found at: http://www.metaeficient.com/renewable-power/solar-canopies-for-parking-lots.html.

\* cited by examiner

SOLAR CANOPY CONNECTOR SYSTEM

I. COPYRIGHT NOTICE AND AUTHORIZATION

This patent document contains material which is subject to copyright protection.

©Copyright 2009. Chevron Energy Solutions. All rights reserved.

With respect to this material which is subject to copyright protection. The owner, Chevron Energy Solutions has no objection to the facsimile reproduction by any one of the patent disclosure, as it appears in the Patent and Trademark Office patent files or records of any country, but otherwise reserves all rights whatsoever.

II. FIELD OF THE INVENTION

This invention relates to solar canopy connector system.

III. BACKGROUND OF THE INVENTION

Zee channels are light and strong structural elements. They may be used, e.g., to support solar panels in a solar canopy support system. Solar energy is a clean, renewal energy source. Photo-electro voltaic cell technology is increasing rapidly and makes installation of solar collector panels housing the photo-electro voltaic cells more and more economically feasible. Beyond the photo-electro voltaic cell technology itself are the problems of placement and support of the solar collector panels. Large numbers of solar collector panels must be assembled in series to achieve useful power production. In remote areas these may be placed on the ground without interfering with land use. In more developed areas, it is desirable to place the solar collector panels such that the land may also be used for other purposes, e.g., for parking lots, school/office hallways, playgrounds, or sports fields. To achieve this requires an elevated structure to support the solar collector panels.

Prior known systems for attaching solar panels or other elements to zee channels are expensive are inefficient and overly expensive. It is desirable to have a method and system which overcomes the deficiencies of known systems. The instant invention provides such a solution.

IV. SUMMARY OF THE INVENTION

The invention includes a solar canopy connector system for attaching a solar power array to a Zee channel, including: an anchor member for removably fixing to a top portion of a Zee channel and for resting against the bottom portion of two solar power arrays, comprising an elongated form including a plurality of sections, said sections including: a planar step section with a front end and back end; a riser section having a top end and a free end and being substantially perpendicular to, extending downwardly from and adjoining the step section, the top end of the riser section adjoining the front end of the planar step section; an angled kick section having a top end and a bottom end and extending downwardly and outwardly from and adjoining the planar step section, the top end of the angled kick section adjoining the back end of the planar step section, the bottom end of the angled kick section being angled away from the front end of the planar step section; an angled hook section, for hooking an edge portion of a Zee channel, having a bottom end and a free end and extending upwardly from and adjoining the angled kick section and inwardly towards the planar step section, the bottom end of the angled hook section adjoining the free end of the angled kick section, the bottom end of the angled hook section being angled toward the front end of the planar step section, a head member for removably attaching to the anchor member for clamping the two solar power arrays between a bottom portion of the head member and a top portion of the anchor member, comprising an elongated form including a plurality of sections, said sections including: two substantially vertical planar riser sections, each having a top end and a bottom end and being substantially parallel to each other; a substantially horizontal joiner section, disposed substantially perpendicular to the planar riser sections, for joining the two riser sections, having a left end and a right end, the left end of the joiner section adjoining the bottom end of one riser section, and the right end of the joiner section adjoining the bottom end of the other riser section, thereby forming a U-like assembly; two substantially horizontal planar clamping sections, disposed substantially perpendicular to the planar riser sections, for clamping solar power arrays, each having a left side and a right side, where one side is fixed and the other is free, the left side of one clamping section adjoining the top end of one riser section and the free side of the one clamping section extending away from the one riser section at approximately a perpendicular disposition, and the right side of the other clamping section adjoining the top end of the other riser section and the free side of the other clamping section extending away from the other riser section at approximately a perpendicular disposition; thereby forming a U-like assembly with flanges extending from the two top portions of the U-like assembly; wherein the head member is configured to be removably fixed to the anchor member, wherein a bottom portion of the solar power arrays rests on a top portion of the planar step section of the anchor member, and a bottom portion of the planar clamping sections of the head member rests on a top portion of the solar power arrays, thereby clamping the two solar power arrays to the Zee channel.

In another embodiment, the invention includes a solar canopy connector system for removably attaching a solar power array to a Zee channel, comprising: an anchor member for removably fixing to a top portion of a Zee channel and for resting against the bottom portion of two solar power arrays, comprising an elongated form including a plurality of sections, said sections including: a planar step section with a front end and back end; a riser section having a top end and a free end and being substantially perpendicular to, extending downwardly from and adjoining the step section, the top end of the riser section adjoining the front end of the planar step section; an angled kick section having a top end and a bottom end and extending downwardly and outwardly from and adjoining the step section, the top end of the angled kick section adjoining the back end of the planar step section, the bottom end of the angled kick section being angled away from the front end of the planar step section; an angled hook section, for hooking an edge portion of a Zee channel, having a bottom end and a free end and extending upwardly from and adjoining the angled kick section and inwardly towards the planar step section, the bottom end of the angled hook section adjoining the free end of the angled kick section, the bottom end of the angled hook section being angled toward the front end of the planar step section a head member for removably attaching to the anchor member for clamping the two solar power arrays between a bottom portion of the head member and a top portion of the anchor member, comprising an elongated form including a plurality of sections, said sections including: a substantially vertical planar riser section, having a top end and a bottom end; a substantially horizontal base section, disposed substantially perpendicular to the planar riser section, having a left end and a right end, the left end of the base section adjoining the bottom end of one riser section, and the right end of the joiner section free, thereby forming a L-like assembly; a substantially horizontal planar clamping section, disposed substantially perpendicular to the planar riser section, for clamping a solar power array, having a left side and a right side, where one side is fixed and the other is free, the right side of one clamping section adjoining the top end of the riser section and the free side of the clamping section extending away from the riser section at approximately a perpendicular disposition; thereby forming a one-half T-like assembly with a flange extending from the top portion of the L-like assembly; wherein the head member is configured to be removably fixed to the anchor member, wherein a bottom portion of the solar power array rests on a top portion of the planar step section of the anchor member, and a bottom portion of the planar clamping section of the head member rests on a top portion of the solar power array, thereby clamping the solar power array to the Zee channel.

These and other features and advantages of the present invention will be made more apparent through a consideration of the following detailed description of a preferred embodiment of the invention. In the course of this description, frequent reference will be made to the attached drawings.

VI. DETAILED DESCRIPTION OF PREFERRED EMBODIMENTS

Figure 1A:
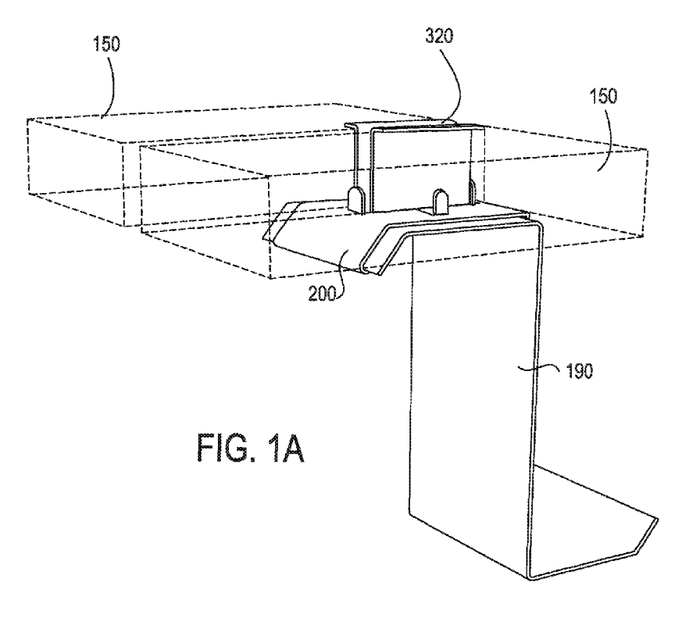
FIGS. 1A and 1B show perspective views in one embodiment of a clip assembly for attaching solar panels to zee channels, at a middle section of and at an end section of the solar canopy array, respectively.
Figure 1B:
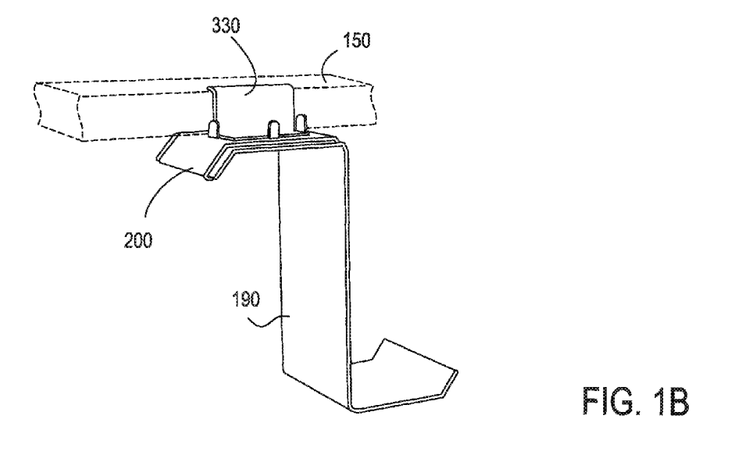
Figure 2A:
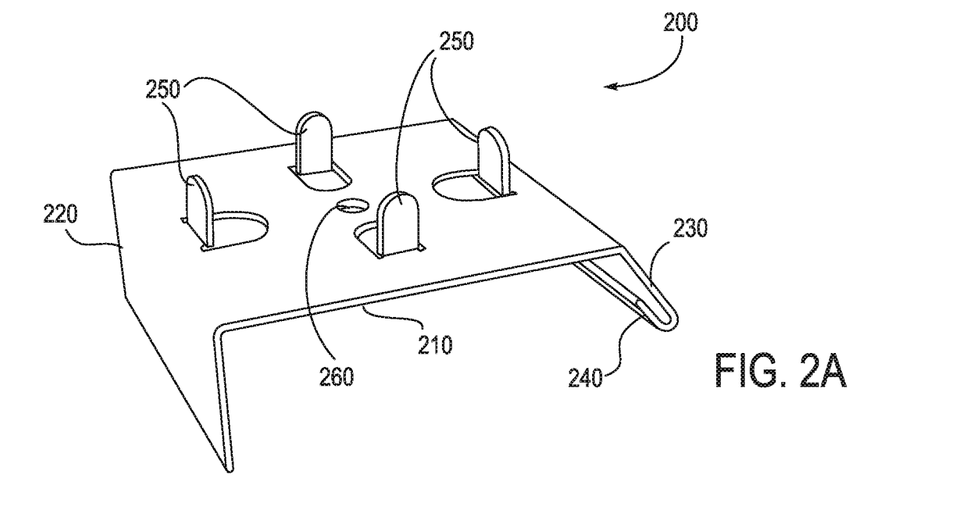
FIGS. 2A and 2B show a top perspective view in another embodiment of an anchor member of a clip assembly.
Figure 2B:
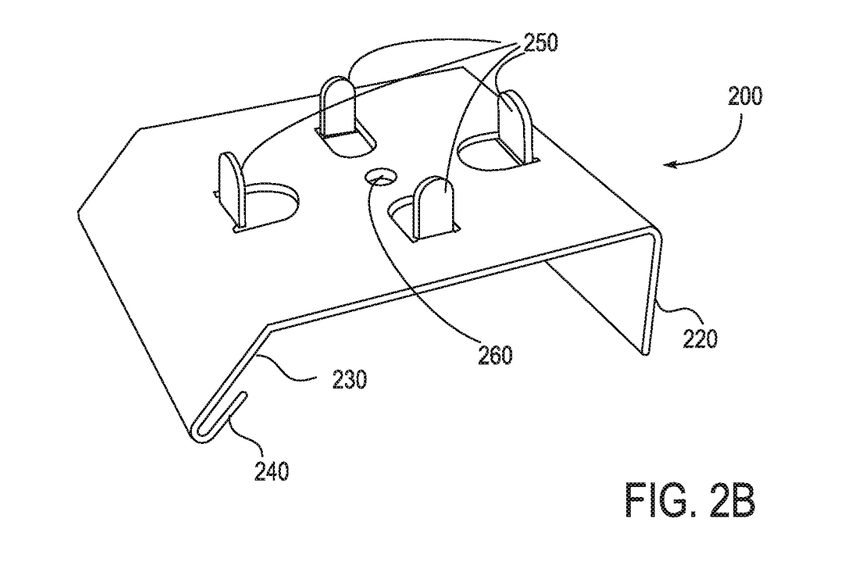

FIGS. 1A and 1B show perspective views in one embodiment of a clip assembly for attaching solar panels to zee channels, at a middle section of and at an end section of a solar canopy array, respectively. FIGS. 2A and 2B show a top perspective view in another embodiment of an anchor member of a clip assembly for attaching solar panels to zee channels. The invention is described with reference to FIGS. 1A, 1B, 2A, and 2B. FIGS. 2A and 2B depict one embodiment of an anchor member 200 of the invention. A planar step section 210 of the anchor member 200 is configured and adapted to rest on the more horizontally oriented portion of the zee channel 190. A riser section 220 of the anchor member rests against the more vertically oriented portion of the zee channel 190. An angled kick section 230 rests against the more angled portion of zee channel 190. Angled hook section 240 of zee channel 190 hooks around the edge portion of the more angled portion of the zee channel 190.

The angled hook section 240 together with riser section 220 secures the anchor member from movement perpendicularly to the longitudinal axis of the zee channel 190. A screw or nut and bolt are preferably installed through both the anchor member and the zee channel 190 to prevent any movement along the longitudinal axis of the zee channel 190. In a preferable embodiment a bottom portion of tab sections 250 are attached to and substantially perpendicular to planar step section 210. In a preferable embodiment tab sections 250 are integral with planar step section 210. The two tab sections 250 along the lateral axis of the anchor member 200 are for providing proper spacing between the solar panels, i.e., to allow joining of the head member (330 or 320) and anchor member 200. The two tab sections 250 along the longitudinal axis of the anchor member 200 are for aligning the solar panels 150 by engaging in recesses (not shown) in the bottom of the solar panels as they rest on the zee channels 190. Anchor member 200, in one embodiment is comprised of 14 to about 18 gauge sheet metal. Head members 320 or 330, in one embodiment are comprised of 12 to about 14 gauge sheet metal. In addition to sheet metal, either the head member or anchor member may be fabricated by other known materials and fabrication methods such as a cast metal, e.g., cast aluminum. Suitable dimensions of anchor member 200 and head members 320 or 330 will vary depending the zee channels and solar canopies to which it will be applied. Typical dimensions of the anchor member are from about 3.0" to about 4.0" wide, from about 3.5" to about 4.5" long, and from about 1" to about 3" tall. Typical dimensions of the head member are from about 1" to about 3" wide, from about 2" to about 3" long, and from about 1" to about 3" tall. These dimensions are not meant to limit the invention and the head member and anchor member in various embodiments may be adjusted to fit a wide variety of zee channels and solar panels.

Figure 3A:
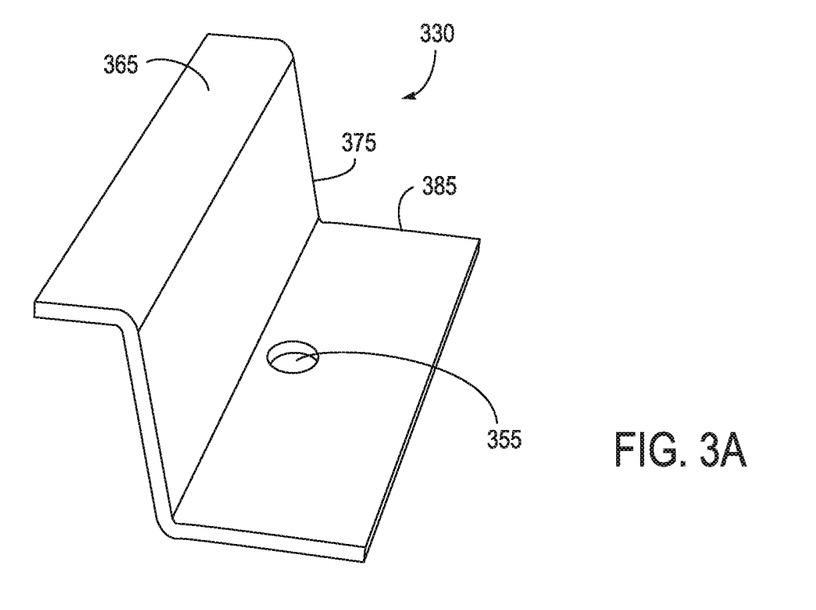
FIGS. 3A and 3B show perspective views in another embodiment of a head member of a clip assembly for attaching solar panels, at a end section of and at a mid-section of the solar canopy array, respectively, to zee channels in the embodiment of FIG. 1.
Figure 3B:
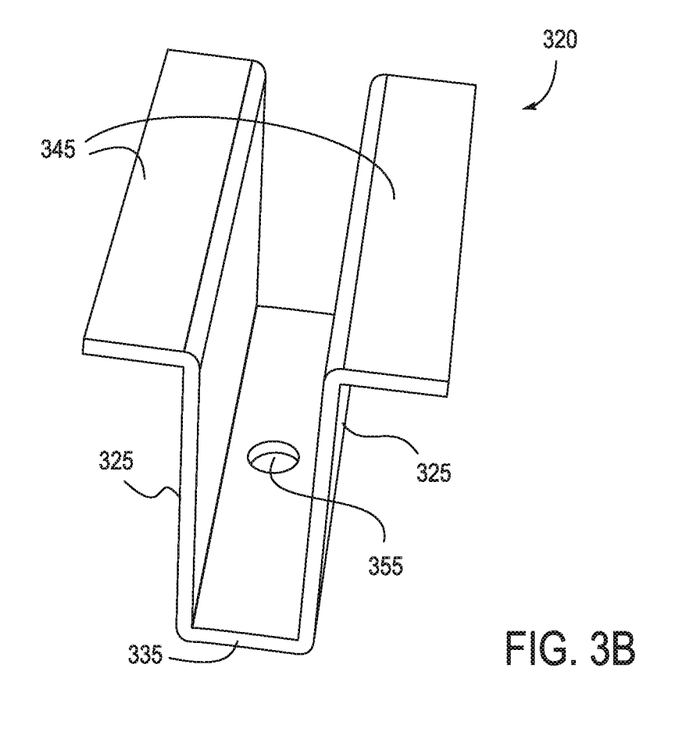

FIGS. 3A and 3B show perspective views in another embodiment of a head member 330 or 320 of a clip assembly for attaching solar panels, at an end section of and at a mid-section of the solar canopy array, respectively.

The head member 330 or 320 is for clamping one or two solar panels, respectively, between a bottom portion of the head member 330 or 320 and a top portion of the anchor member 200. The head member is an elongated form including a plurality of sections. With reference to FIG. 3B, in one embodiment, the sections include two substantially vertical planar riser sections 325, each having a top end and a bottom end and being substantially parallel to each other. There is also a substantially horizontal joiner section 335, for joining the two riser sections, having a left end and a right end, the left end of the joiner section adjoining the bottom end of one riser section, and the right end of the joiner section adjoining the bottom end of the other riser section, thereby forming a U-like assembly.

Also, there are two substantially horizontal planar clamping sections 345, for clamping solar panels, each having a left side and a right side, the left side of one clamping section adjoining the top end of one riser sections 325, and the right side of the other clamping section adjoining the top end of the other riser sections 325; thereby forming a U-like assembly with flanges 345 extending from the two top portions of the U-like assembly.

Head member 320 is configured and adapted to clamp two solar power arrays 150, one with each of the two flange members 345 (i.e., horizontal planar clamping sections). With reference to FIG. 3A, head member 330 is configured and adapted to clamp one solar power array 150 with its single flange member 365 (i.e., horizontal planar clamping section). Head member 320 has only one substantially vertical planar riser section 375 and hence the substantially horizontal base section 385 (corresponding to joiner section 335 in head member 320) is attached at only one side.

The head member, 330 or 320, is removably fixed to the anchor member 200, wherein a bottom portion of the solar power arrays rests on a top portion of the planar step section 210 of the anchor member 200, and a bottom portion of the planar clamping sections 345 of the head member 330 or 320 rests on a top portion of the solar power arrays 150, thereby clamping the two solar power arrays to the zee channel 190.

The head member 320 or 330 is removably attached, e.g., via bolt or screws to the anchor member 200 through, preferably threaded, hole 355 in head member 330 and 320 and, preferably threaded, hole 260 in anchor member 200, thus sandwiching the solar panels in between the head member (320 or 330) and anchor member 200 of the clip assembly.

Figure 4:
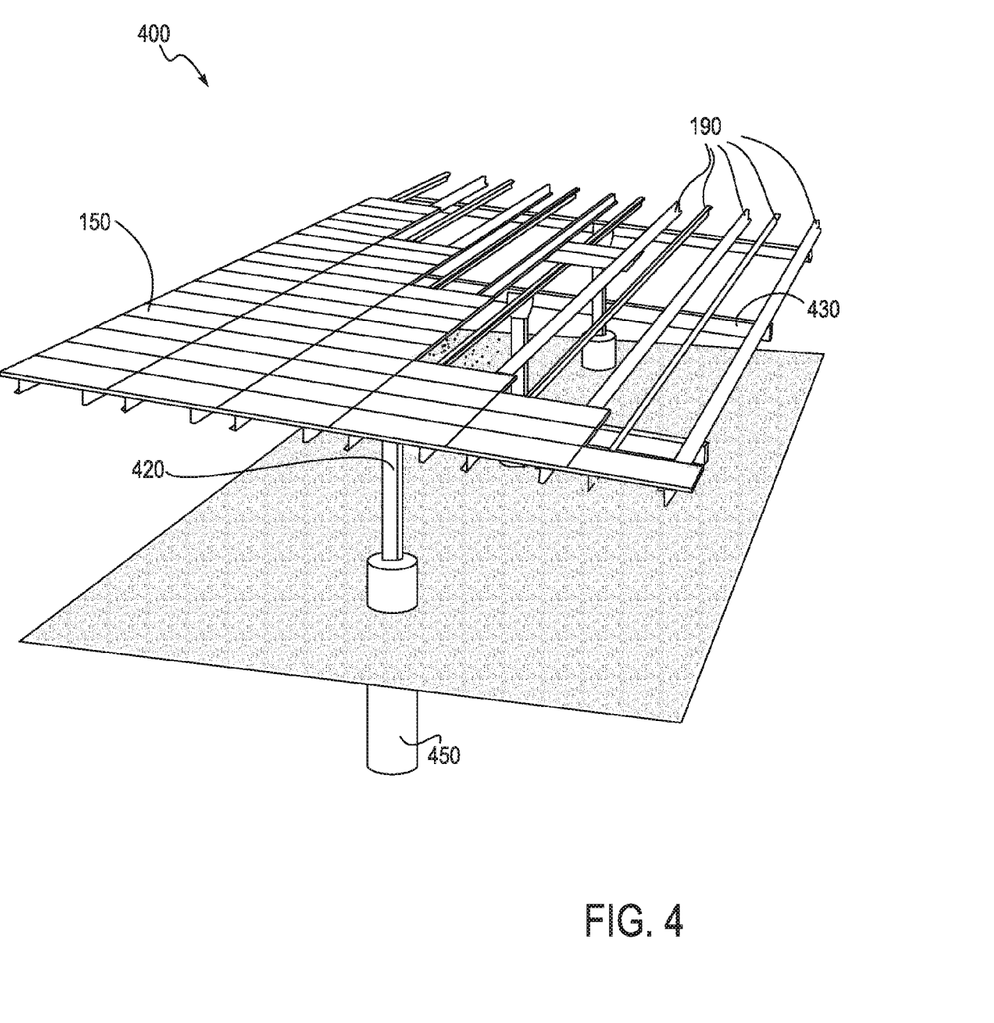
FIG. 4 is a top perspective view of one embodiment of the present invention.

FIG. 4 is a top perspective view of one embodiment of an environment for application of the present invention. Solar canopy support system 400 is shown—both above and below grade level. Reinforced concrete bollard 450 rests in the ground and provides the support for beam support column 420. Beam support column 420 is attached to reinforced concrete bollard 450 by any known method, by embedding a lower portion of beam support column 420 in the concrete of beam support column 420 while still wet or placing it in a hole and then pouring the concrete around it, or by embedding bolts in the reinforced concrete bollard 450 with protruding ends which permit attachment of the beam support column 420 by bolting.

The beam support columns 420 supports zee channel support beams 430. The zee channel support beam 430 supports at least two zee channels 190. This provides the solar canopy support system for supporting a solar power array 150. The solar power array is a plurality of solar panels which are attached to the zee channels 190 by the solar panel connector system of the invention, i.e., anchor member 200 and head member 320 or 330 (shown in FIGS. 1-3).

Figure 5A:
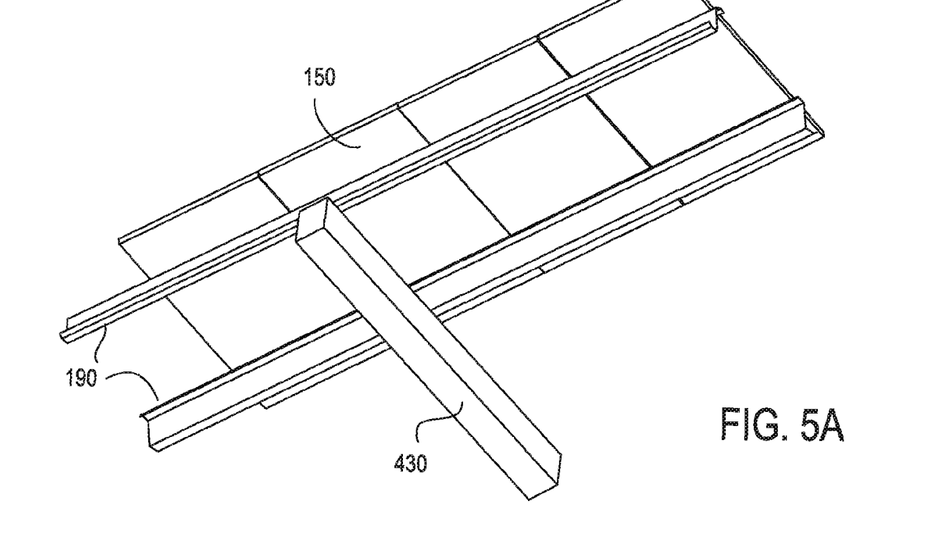
FIGS. 5A and 5B show a bottom and top perspective view, respectively, in one embodiment of a support assembly of the invention.
Figure 5B:
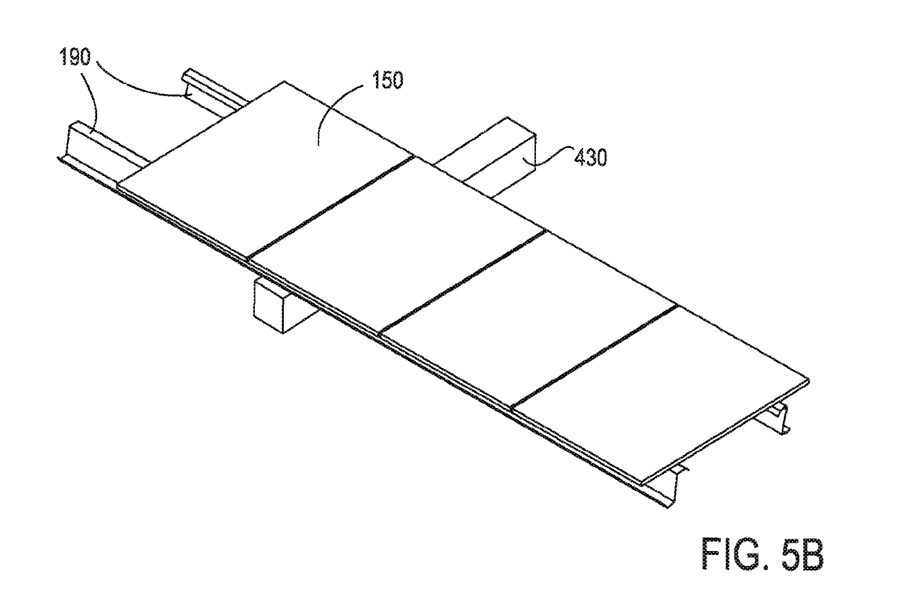

FIGS. 5A and 5B show a bottom and top perspective view, respectively, in one embodiment of an environment for application of the present invention. Zee channel support beam 430 supports at least two zee channels 190. Zee channels 190 support a solar power array 450. The solar power array is a plurality of solar panels which are attached to the zee channels 190 by the solar panel connector system of the invention, i.e., anchor member 200 and head member 320 or 330 (shown in FIGS. 1-3).

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A solar canopy connector system for removably attaching a solar power array to a Zee channel, comprising:
   (a) an anchor member for removably fixing to a top portion of a Zee channel and for resting against the bottom portion of two solar power arrays, comprising an elongated form including a plurality of sections, said sections including:
      (1) a planar step section with a front end and back end;
      (2) a riser section having a top end and a free end and being substantially perpendicular to, extending downwardly from and adjoining the step section, the top end of the riser section adjoining the front end of the planar step section;
      (3) an angled kick section having a top end and a bottom end and extending downwardly and outwardly from and adjoining the planar step section, the top end of the angled kick section adjoining the back end of the planar step section, the bottom end of the angled kick section being angled away from the front end of the planar step section;
      (4) an angled hook section, for hooking an edge portion of a Zee channel, having a bottom end and a free end and extending upwardly from and adjoining the angled kick section and inwardly towards the planar step section, the bottom end of the angled hook section adjoining the free end of the angled kick section, the bottom end of the angled hook section being angled toward the front end of the planar step section
   (b) a head member for removably attaching to the anchor member for clamping the two solar power arrays between a bottom portion of the head member and a top portion of the anchor member, comprising an elongated form including a plurality of sections, said sections including:
      (1) two substantially vertical planar riser sections, each having a top end and a bottom end and being substantially parallel to each other;
      (2) a substantially horizontal joiner section, disposed substantially perpendicular to the planar riser sections, for joining the two riser sections, having a left end and a right end, the left end of the joiner section adjoining the bottom end of one riser section, and the right end of the joiner section adjoining the bottom end of the other riser section, thereby forming a U-like assembly;
      (3) two substantially horizontal planar clamping sections, disposed substantially perpendicular to the planar riser sections, for clamping solar power arrays, each having a left side and a right side, where one side is fixed and the other is free, the left side of one clamping section adjoining the top end of one riser section and the free side of the one clamping section extending away from the one riser section at approximately a perpendicular disposition, and the right side of the other clamping section adjoining the top end of the other riser section and the free side of the other clamping section extending away from the other riser section at approximately a perpendicular disposition; thereby forming a U-like assembly with flanges extending from the two top portions of the U-like assembly;
   (c) wherein the head member is configured to be removably fixed to the anchor member, wherein a bottom portion of the solar power arrays rests on a top portion of the planar step section of the anchor member, and a bottom portion of the planar clamping sections of the head member rests on a top portion of the solar power arrays, thereby clamping the two solar power arrays to the Zee channel.

2. The solar canopy connector system of claim 1, wherein the anchor member further comprises a plurality of substantially vertical riser tabs, for engaging and aligning the solar power arrays, each riser tab having a free end and a bottom end and being substantially perpendicular to extending upwardly from and adjoining the planar step section, the bottom end of the riser tabs adjoining a top portion of the planar step section.

3. The solar canopy connector system of claim 2, wherein the plurality of substantially vertical riser tabs are integral with the planar step section.

4. The solar canopy connector system of claim 1, wherein the anchor member is from about 3.0" to about 4.0" wide, from about 3.5" to about 4.5" long, and from about 1" to about 3" tall.

5. The solar canopy connector system of claim 1, wherein the head member is from about 1" to about 3" wide, from about 2" to about 3" long, and from about 1" to about 3" tall.

6. A solar canopy connector system for removably attaching a solar power array to a Zee channel, comprising:
  (a) an anchor member for removably fixing to a top portion of a Zee channel and for resting against the bottom portion of two solar power arrays, comprising an elongated form including a plurality of sections, said sections including:
    (1) a planar step section with a front end and back end;
    (2) a riser section having a top end and a free end and being substantially perpendicular to, extending downwardly from and adjoining the step section, the top end of the riser section adjoining the front end of the planar step section;
    (3) an angled kick section having a top end and a bottom end and extending downwardly and outwardly from and adjoining the step section, the top end of the angled kick section adjoining the back end of the planar step section, the bottom end of the angled kick section being angled away from the front end of the planar step section;
    (4) an angled hook section, for hooking an edge portion of a Zee channel, having a bottom end and a free end and extending upwardly from and adjoining the angled kick section and inwardly towards the planar step section, the bottom end of the angled hook section adjoining the free end of the angled kick section, the bottom end of the angled hook section being angled toward the front end of the planar step section
  (b) a head member for removably attaching to the anchor member for clamping the two solar power arrays between a bottom portion of the head member and a top portion of the anchor member, comprising an elongated form including a plurality of sections, said sections including:
    (1) a substantially vertical planar riser section, having a top end and a bottom end;
    (2) a substantially horizontal base section, disposed substantially perpendicular to the planar riser section, having a left end and a right end, the left end of the base section adjoining the bottom end of one riser section, and the right end of the joiner section free, thereby forming a L-like assembly;
    (3) a substantially horizontal planar clamping section, disposed substantially perpendicular to the planar riser section, for clamping a solar power array, having a left side and a right side, where one side is fixed and the other is free, the right side of one clamping section adjoining the top end of the riser section and the free side of the clamping section extending away from the riser section at approximately a perpendicular disposition; thereby forming a one-half T-like assembly with a flange extending from the top portion of the L-like assembly;
  (c) wherein the head member is configured to be removably fixed to the anchor member, wherein a bottom portion of the solar power array rests on a top portion of the planar step section of the anchor member, and a bottom portion of the planar clamping section of the head member rests on a top portion of the solar power array, thereby clamping the solar power array to the Zee channel.

7. The solar canopy connector system of claim 6, wherein the anchor member further comprises a plurality of substantially vertical riser tabs, for engaging and aligning the solar power arrays, each riser tab having a free end and a bottom end and being substantially perpendicular to extending upwardly from and adjoining the planar step section, the bottom end of the riser tabs adjoining a top portion of the planar step section.

8. The solar canopy connector system of claim 6, wherein the plurality of substantially vertical riser tabs are integral with the planar step section.

9. The solar canopy connector system of claim 6, further comprising a solar canopy array, having an upper portion sandwiched in between the anchor member and the head member, the anchor member and head member being fixedly connected.

10. The solar canopy connector system of claim 6, wherein the anchor member is from about 3" to about 4" wide and from about 3.5" to about 4.5" long and from about 1" to about 3" tall.

11. The solar canopy connector system of claim 6, wherein the anchor member is from about 3" to about 4" wide, from about 3.5" to about 4.5" long, and from about 1" to about 3" tall.

12. The solar canopy connector system of claim 6, wherein the head member is from about 1" to about 3" wide, from about 2" to about 3" long, and from about 1" to about 3" tall.

* * * * *